(12) United States Patent
Rubin et al.

(10) Patent No.: US 8,186,096 B2
(45) Date of Patent: May 29, 2012

(54) FISHING LURE WITH LINE ATTACHMENT STRUCTURE

(76) Inventors: Raymond Albert Rubin, Eagle River, WI (US); William Allan Reid, Winnipeg (CA); Philip Craig Reid, Winnipeg (CA)

(*) Notice: Subject to any disclaimer, the term of this patent is extended or adjusted under 35 U.S.C. 154(b) by 0 days.

(21) Appl. No.: 13/108,414

(22) Filed: May 16, 2011

(65) Prior Publication Data
US 2012/0030990 A1    Feb. 9, 2012

Related U.S. Application Data

(63) Continuation-in-part of application No. 12/851,173, filed on Aug. 5, 2010.

(51) Int. Cl.
*A01K 91/04* (2006.01)
*A01K 85/00* (2006.01)

(52) U.S. Cl. .............. 43/44.83; 43/42.49; 43/44.81; 43/42.39; 43/44.2; 43/44.8

(58) Field of Classification Search .............. 43/44.83, 43/42.49, 44.81, 42.39, 44.2, 44.4, 44.8
See application file for complete search history.

(56) References Cited

U.S. PATENT DOCUMENTS

| | | | | |
|---|---|---|---|---|
| 497,962 A | * | 5/1893 | D'Ivernois | 43/44.81 |
| 1,471,959 A | * | 10/1923 | Halferty | 43/44.83 |
| 2,185,666 A | * | 1/1940 | Hill, Jr. | 43/44.81 |
| 2,315,575 A | * | 4/1943 | Austad | 43/42.36 |
| 2,589,007 A | * | 3/1952 | Landon | 43/42.39 |
| 2,765,572 A | * | 10/1956 | Woolfe | 43/42.39 |
| 2,836,922 A | * | 6/1958 | Cox | 43/44.2 |
| 2,847,220 A | * | 8/1958 | Heffron et al. | 43/44.83 |
| 2,871,540 A | * | 2/1959 | Smith | 43/44.83 |
| 2,926,454 A | * | 3/1960 | Gottman | 43/44.83 |
| 2,984,882 A | * | 5/1961 | Winn | 43/44.83 |
| 3,026,647 A | * | 3/1962 | Rainey | 43/44.4 |
| 3,344,549 A | * | 10/1967 | Peters et al. | 43/42.39 |
| 3,550,306 A | * | 12/1970 | Heitman | 43/44.2 |
| 3,611,614 A | * | 10/1971 | Ward | 43/42.39 |
| 3,724,116 A | * | 4/1973 | Lindner et al. | 43/44.83 |
| 3,750,321 A | * | 8/1973 | McClellan | 43/42.39 |

(Continued)

FOREIGN PATENT DOCUMENTS
WO        9300801        1/1993
(Continued)

OTHER PUBLICATIONS

"E2H Flatfish size 6", web product page, Easy2hookUSA, www.outdoorspecialtyinnovations.com.

*Primary Examiner* — Darren W Ark

(74) *Attorney, Agent, or Firm* — Jeffrey A. Proehl; Woods, Fuller, Shultz and Smith, P.C.

(57) ABSTRACT

A fishing lure comprises a hook structure including a hook portion for engaging the mouth flesh of a fish, a shank portion connected to the hook portion, and a line securing portion for securing a line to the hook structure. The line securing portion forms an unsecured loop so that a portion of fishing line is movable into the eye of the loop without threading. The lure also comprises a body structure mounted on the hook structure. The body structure has an anchor notch formed thereon and configured to receiving a portion of a looped fishing line.

2 Claims, 3 Drawing Sheets

U.S. PATENT DOCUMENTS

| | | | | |
|---|---|---|---|---|
| 3,750,323 A * | 8/1973 | Weis | | 43/42.39 |
| 3,785,011 A * | 1/1974 | Marks | | 43/44.83 |
| 3,803,747 A * | 4/1974 | Cartwright | | 43/44.81 |
| 3,848,354 A * | 11/1974 | Austad et al. | | 43/44.83 |
| 3,936,971 A * | 2/1976 | McGahee | | 43/44.83 |
| 4,141,116 A * | 2/1979 | Zalonis | | 43/44.83 |
| 4,280,296 A * | 7/1981 | Volenec | | 43/44.81 |
| 4,367,607 A * | 1/1983 | Hedman | | 43/44.8 |
| D274,833 S * | 7/1984 | Svensson | | D22/134 |
| 4,535,562 A * | 8/1985 | Fry | | 43/44.83 |
| 4,712,326 A * | 12/1987 | Hoover et al. | | 43/42.39 |
| 4,713,907 A * | 12/1987 | Dudeck | | 43/42.39 |
| 4,771,567 A * | 9/1988 | Cannon | | 43/42.39 |
| 4,791,749 A * | 12/1988 | Stazo | | 43/42.39 |
| 4,819,366 A * | 4/1989 | Manno | | 43/44.83 |
| 4,858,367 A * | 8/1989 | Rabideau | | 43/42.39 |
| 4,879,835 A * | 11/1989 | Sprayberry | | 43/44.83 |
| 4,905,403 A * | 3/1990 | Manno | | 43/44.83 |
| 4,956,933 A * | 9/1990 | Radtchenko | | 43/42.49 |
| 4,964,234 A * | 10/1990 | Davey | | 43/44.2 |
| 5,007,140 A * | 4/1991 | Brookey | | 43/44.83 |
| 5,020,266 A * | 6/1991 | Williamson | | 43/42.39 |
| 5,081,786 A * | 1/1992 | Cobb | | 43/44.81 |
| 5,157,859 A * | 10/1992 | Wirkus | | 43/42.39 |
| 5,203,105 A * | 4/1993 | Bond et al. | | 43/42.39 |
| 5,203,106 A * | 4/1993 | Huppert | | 43/44.83 |
| 5,231,786 A * | 8/1993 | Hughes | | 43/42.39 |
| 5,339,559 A * | 8/1994 | Strobbe | | 43/44.8 |
| 5,373,658 A * | 12/1994 | Huppert | | 43/42.39 |
| 5,491,927 A * | 2/1996 | Ortiz | | 43/42.39 |
| 5,596,832 A * | 1/1997 | Manno | | 43/44.83 |
| 5,598,660 A * | 2/1997 | Walton | | 43/42.49 |
| 5,603,181 A * | 2/1997 | Abdul-Raheem | | 43/42.49 |
| 5,689,911 A * | 11/1997 | Lin et al. | | 43/44.83 |
| 5,694,715 A * | 12/1997 | Manno | | 43/44.83 |
| 5,899,015 A * | 5/1999 | Link | | 43/42.39 |
| 5,937,570 A * | 8/1999 | Abdul-Raheem | | 43/44.92 |
| 5,970,650 A * | 10/1999 | Mammel | | 43/44.83 |
| 6,122,857 A * | 9/2000 | Rhoten | | 43/42.39 |
| 6,233,863 B1 * | 5/2001 | Dotson | | 43/42.39 |
| 6,240,672 B1 * | 6/2001 | Huppert | | 43/42.39 |
| 6,334,273 B2 * | 1/2002 | Turner et al. | | 43/44.83 |
| 6,760,997 B1 * | 7/2004 | Mammel | | 43/44.83 |
| 6,772,553 B2 * | 8/2004 | Phillips et al. | | 43/42.39 |
| 6,898,894 B1 * | 5/2005 | Anderson | | 43/42.39 |
| 7,036,266 B2 * | 5/2006 | Falcon | | 43/44.81 |
| 7,614,178 B2 * | 11/2009 | Hoyt | | 43/42.39 |
| 7,735,256 B2 * | 6/2010 | Hatfield | | 43/44.83 |
| 2001/0015029 A1 * | 8/2001 | Carter et al. | | 43/44.81 |
| 2001/0045048 A1 * | 11/2001 | Johnson | | 43/42.39 |
| 2002/0078619 A1 * | 6/2002 | Hurtle, Jr. | | 43/42.39 |
| 2003/0182844 A1 * | 10/2003 | Berthold | | 43/44.83 |
| 2006/0037232 A1 * | 2/2006 | Gill | | 43/42.39 |
| 2006/0265939 A1 * | 11/2006 | Friedrichs | | 43/44.83 |
| 2007/0044368 A1 * | 3/2007 | Duckett | | 43/42.39 |
| 2007/0044369 A1 * | 3/2007 | Franklin | | 43/44.91 |
| 2007/0119092 A1 * | 5/2007 | Gruber | | 43/44.83 |
| 2007/0227060 A1 * | 10/2007 | Mammel | | 43/44.83 |
| 2007/0271838 A1 * | 11/2007 | Lowiecki | | 43/42.39 |
| 2008/0047192 A1 * | 2/2008 | Bennis | | 43/44.8 |
| 2008/0172924 A1 * | 7/2008 | Thorne | | 43/42.39 |
| 2008/0202018 A1 * | 8/2008 | Gill | | 43/42.39 |
| 2008/0250693 A1 * | 10/2008 | Krueger | | 43/42.39 |
| 2009/0211145 A1 * | 8/2009 | Thorne | | 43/42.39 |
| 2009/0255169 A1 * | 10/2009 | Lowitzki et al. | | 43/42.37 |
| 2009/0313878 A1 * | 12/2009 | Taylor | | 43/44.83 |
| 2010/0287814 A1 * | 11/2010 | Barefoot | | 43/44.81 |

FOREIGN PATENT DOCUMENTS

WO    WO 9300801 A1 *    1/1993

* cited by examiner

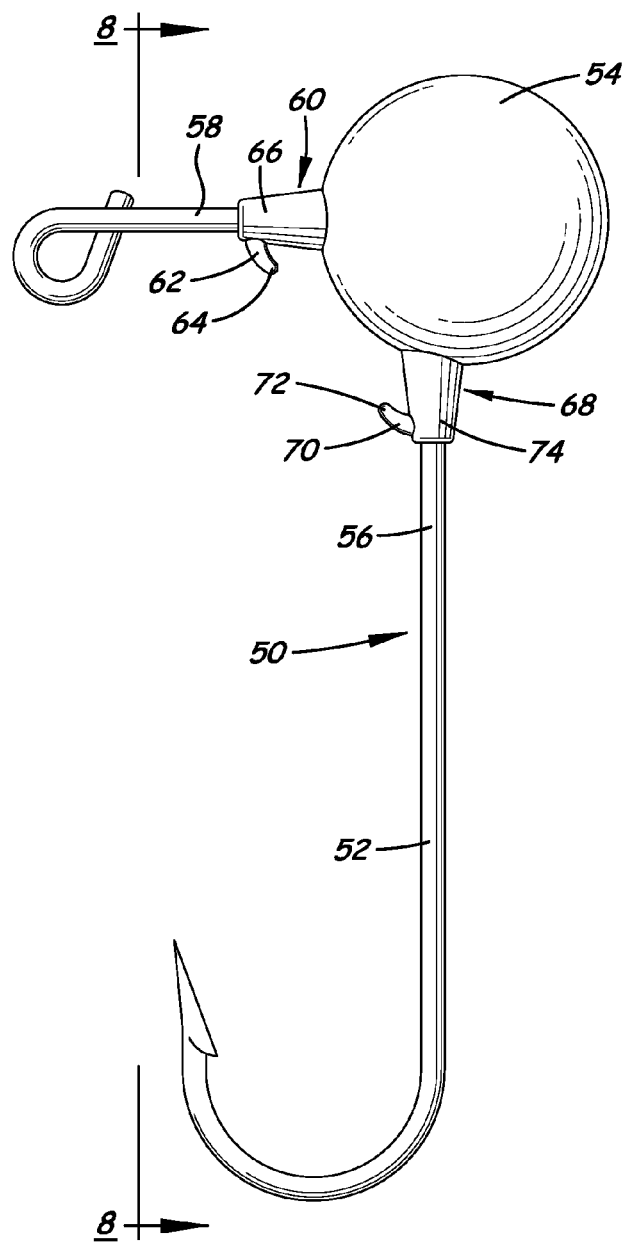
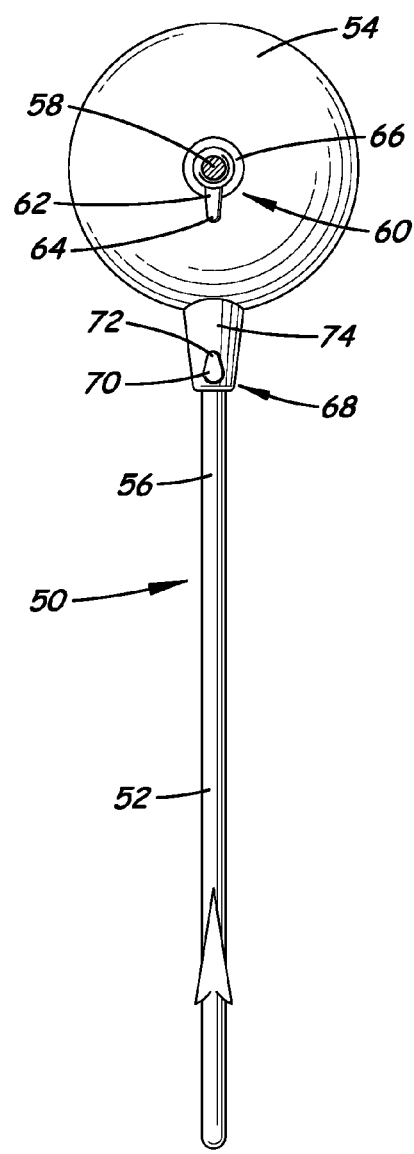
Fig. 7
Fig. 8

FISHING LURE WITH LINE ATTACHMENT STRUCTURE

REFERENCE TO RELATED APPLICATION

This application is a continuation-in-part of U.S. patent application Ser. No. 12/851,173, filed Aug. 5, 2010, pending, which is hereby incorporated by reference in its entirety.

BACKGROUND

Field

The present disclosure relates to fishing hooks and more particularly pertains to a new fishing lure device with line attachment structure.

SUMMARY

The present disclosure describes a new fishing lure device with line attachment structure which may be utilized for providing a user with the ability to relatively easily and quickly attach the lure to the fishing line without having to tie a knot and without having to utilize additional or intermediate structures to include a lure and a hook on the line.

The present disclosure relates to a fishing lure that may comprise a hook structure including a hook portion for engaging the mouth flesh of a fish, a shank portion connected to the hook portion, and a line securing portion for securing a line to the hook structure. The line securing portion forms an unsecured loop so that a portion of fishing line is movable into the eye of the loop without threading. The lure also comprises a body structure mounted on the hook structure. The body structure has an anchor notch formed thereon and configured to receiving a portion of a looped fishing line.

In another aspect, the present disclosure relates to a fishing lure that may comprise a hook structure including a hook portion for engaging the mouth flesh of a fish, a shank portion connected to the hook portion, and a line securing portion for securing a line to the hook structure. The hook portion has a free end with a sharp tip for penetrating the mouth flesh of a fish and a substantially U-shaped configuration. The line securing portion forms an unsecured loop so that a portion of fishing line is movable into the eye of the loop without threading. The lure further comprises a body structure mounted on the shank portion of the hook structure. The body structure has an anchor slot formed thereon and configured to receiving a portion of a looped fishing line.

In yet another aspect, the present disclosure relates to a fishing lure that comprises a hook structure including a hook portion for engaging the mouth flesh of a fish, a shank portion connected to the hook portion, and a line securing portion for securing a line to the hook structure. The line securing portion may form an unsecured loop so that a portion of fishing line is movable into the eye of the loop without threading an end of the line through the eye. A body structure may be mounted on the hook structure. A loop securing structure may be mounted on the body structure for removably holding a loop of fishing line on the body structure. The shank portion may have a first section and a second section, with the first section of the shank portion being linear from the body structure to the hook portion and the second section of the shank portion being linear from the body structure to the loop of the line securing portion. An angle between the linear first section and the linear second section of the shank portion may be substantially perpendicular.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 7 is a schematic side view of an embodiment of the lure of the disclosure having optional features.

FIG. 8 is a schematic top view of the embodiment of the lure of FIG. 7.

DETAILED DESCRIPTION

Figure 1:
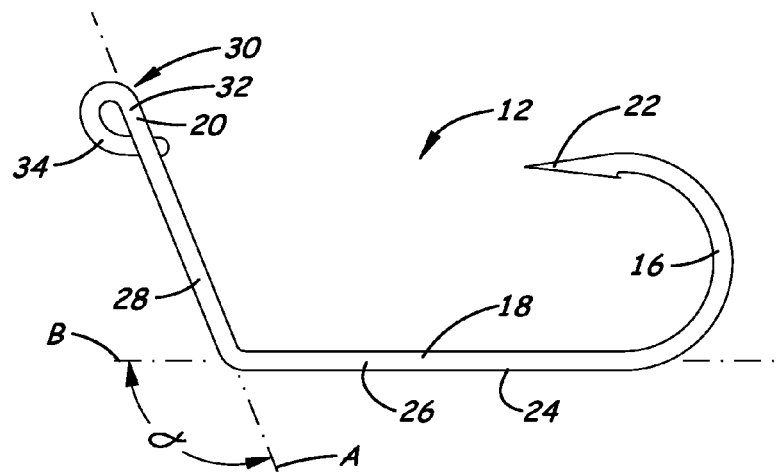
FIG. 1 is a schematic side view of a new fishing lure device with line attachment structure of the present disclosure according to an illustrative embodiment, showing the hook structure without the body structure.
Figure 2:
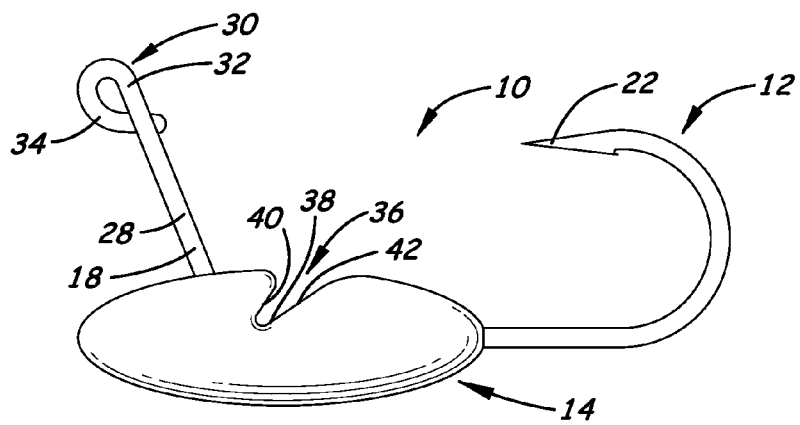
FIG. 2 is a schematic side view of the lure, according to an illustrative embodiment, showing the hook structure and body structure.
Figure 3:
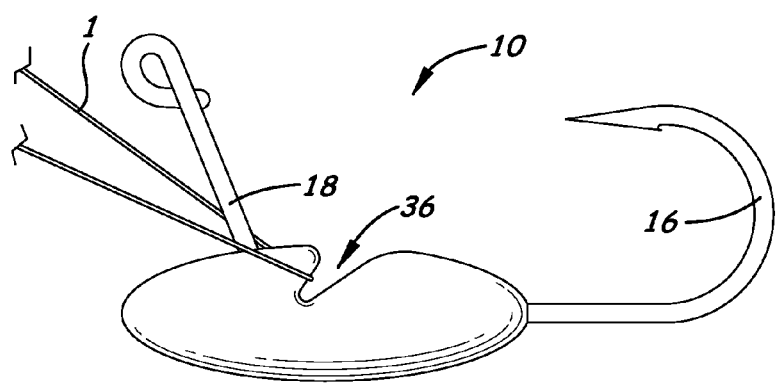
FIG. 3 is a schematic side view of the lure showing a loop of fishing line received in the anchor notch according to an illustrative embodiment.
Figure 4:
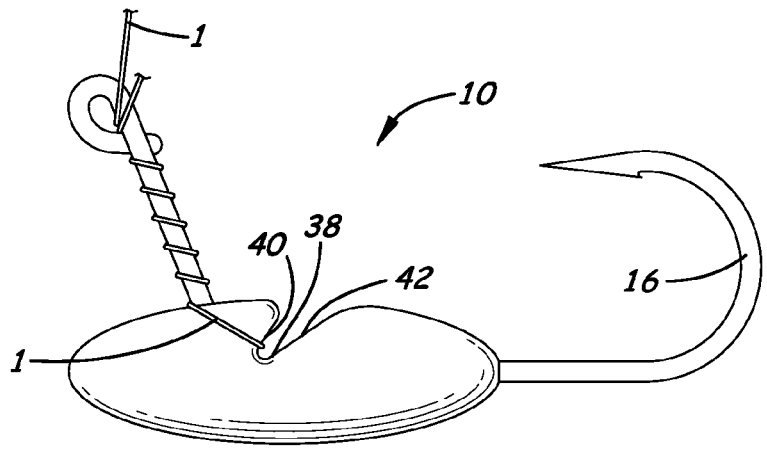
FIG. 4 is a schematic side view of the lure showing the loop of fishing line wrapped about a portion of the shank portion and inserted into the line securing portion, according to an illustrative embodiment.
Figure 5:
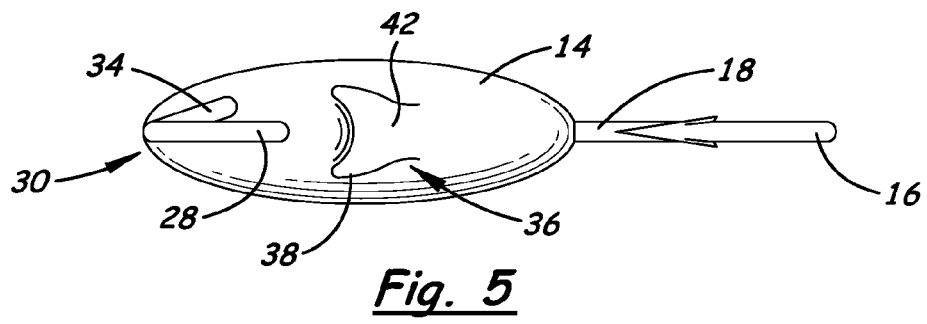
FIG. 5 is a schematic top view of the lure, according to an illustrative embodiment.

With reference now to the drawings, and in particular to FIGS. 1 through 8 thereof, a new fishing lure device with line attachment structure embodying the principles and concepts of the disclosed subject matter will be described.

In general, the disclosure is directed to a fishing lure 10 with features that provide a manner of attaching the lure to a fishing line without having to tie a knot in the fishing line to secure the lure to the line. The fishing lure of this disclosure thus provides the user with the ability to relatively easily and quickly attach the lure to the fishing line without having to tie a knot, and without having to utilize additional or intermediate structures to include a lure and a hook on the line. The user merely has to form a loop with an end portion of the fishing line, and manipulate the line loop with respect to the fishing lure.

The fishing lure 10 may comprise a hook structure 12 and a body structure 14 mounted on the hook structure. In greater detail, the hook structure 12 may include a hook portion 16 for engaging the mouth flesh of a fish, a shank portion 18 connected to the hook portion 16, and a line securing portion 20 connected to the shank portion. In most embodiments, the portions 16, 18, and 20 will be formed from a single piece of wire, although this is not critical to the invention. The hook portion 16 has a first end 22 which is a free end with a sharp tip for penetrating the mouth flesh of a fish, and may include at least one barb. A second end 24 is located opposite of the first end 22 on the hook portion. The hook portion 16 may have a substantially U-shaped configuration between the first 22 and second 24 ends, although other shapes may be utilized that are suitable for engaging the mouth of a fish.

The shank portion 18 of the hook structure is typically integrally connected to the hook portion 16 at the second end 24. The shank portion 18 my have a first section 26 and a second section 28, with the first section being connected to the second end 24 of the hook portion. A bend may be formed in the shank portion between the first and second sections. In some embodiments, the first section 26 may be substantially linear along a first axis (A) and the second section 28 may be substantially linear along a second axis (B). The second axis of the second section may be oriented at an angle (α) with respect to the first axis of the first section, and the angle typically does not include 180 degrees such that the first section and the second section are collinear. In some embodiments, the angle between the first and second axes measures between approximately 90 degrees (such that the first section and second section are substantially perpendicular to each other) and approximately 190 degrees. The angle utilized may be selected for suitability with a particular jig style or type formed by the body structure.

In some preferred embodiments, the second section is oriented substantially perpendicular to the first section. The angle may measure between approximately 85 degrees and approximately 95 degrees, and in some of the most preferred embodiment, the angle measures approximately 90 degrees.

The line securing portion 20 may be configured for securing a line to the hook structure 12. The line securing portion is typically integrally connected to the shank portion 18. The line securing portion may form an unsecured loop 30 so that a portion of fishing line is movable into the eye of the loop without threading the fishing line through the eye of the loop. The line securing portion 20 may comprise a first extent 32 and a second extent 34 forming the loop 30. The first extent 32 may be united to and extend from the shank portion 18, such as the second section 28, and the second extent 34 may extend from the first extent back towards the shank portion. The second extent 34 may diverge from the first extent 32 at a substantially central location on the second extent, and then converge toward the first extent such that a gap formed between the first and second extents decreases. The second extent 34 crosses the first extent, and bypasses the first extent. At the crossing, a gap between the first and second extent may measure less than approximately 0.010 inches, and in some embodiments the gap may measure between approximately 0.005 inches and approximately 0.010 inches. In general, the first extent 32 may be substantially linear, and the second extent 34 may be substantially arcuate in shape. The second extent 34 may being movable away from the first extent 32 upon the application of force to the second extent, and then may return to the original position with respect to the first extent.

The body structure 14 may generally configured to be attractive to fish to cause a fish to attempt to bite on the lure. The body structure 14 may be integrally mounted on the hook structure 12, although removability may be possible. The body structure 14 may be mounted on the shank portion 18 of the hook structure, and more specifically may be mounted on the first section 26 of the shank portion. In some embodiments, the body structure 14 may also be mounted on the second section 28 of the lure structure.

Figure 6:
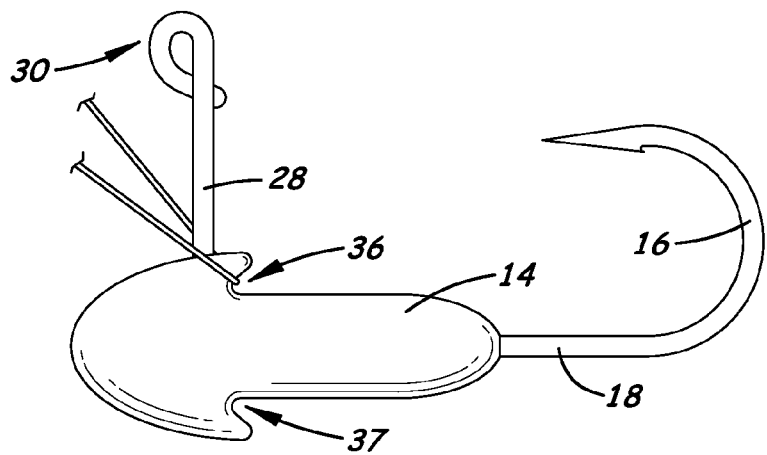
FIG. 6 is a schematic side view of the lure showing variations of the lure.

The body structure 14 may have an anchor notch 36 that is formed thereon and that is configured to receive a portion of a looped fishing line 1. The anchor notch 36 extends into the surface of the body structure 14 to receive the fishing line. In some embodiments, a second anchor notch 37 may be utilized at a different location on the body structure 14 (such as is shown in FIG. 6). Illustratively, the notches 36, 37 may be located at substantially opposite positions on the body structure, although positions on a same side portion may be utilized. The anchor notch 36 may illustratively comprise a slot 38 formed to receive a portion of a fishing line, and the slot may extend between opposite side surfaces of the body structure. The slot 38 may be formed by converging slot surfaces 40, 42 formed on the body structure that extend from the major exterior surface of the body structure 14 into the body structure.

In the most preferred embodiments of the fishing lure 10, the body structure 14 comprises a jig body. The jig body may approximate an attractant for a fish, and may have any one of a number of configurations. Illustrative examples include a ball jig body, a football jig body, a egghead jig body, a grub jig body, a swim jig body, a tip up jig body, a bucktail jig body, a bullet bass jig body, a stand up jig body, a live bait jig body, a walleye jig body, a chub head jig body, an erie jig body, a spire point jig body, a popeye jig body, a shad dart jig body, a sparkie jig body, a shad head jig body, a minnow head jog body, a stand up spinner jig body, a crappie jig body, a worm jig body, a shad jig body, a sparkie jig body, an arky jig body, a horsehead jig body, a ponyhead jig body, a seahorse jig body, a tube jig body, and a bullet jig body, to name some of the many possible configurations. Many other additional configurations may be utilized.

In use, a loop of fishing line is formed toward one end of the fishing line to be attached to the fishing lure. A portion of the loop is inserted into the anchor notch 36 of the body structure, and the loop of fishing line is wrapped about the shank portion 18 of the hook portion that lies between the anchor notch and the loop 30 of the line securing portion 20. The loop of line can be wrapped about the shank portion several times, and in most cases this will require at least six wraps of the line, although fewer wraps may be used and more wraps may be necessary. A portion of the fishing line loop should be inserted into the loop 30 of the securing portion by passing the line portions of the loop between the first and second extents of the line securing portion to thereby retain the line loop in the wrapped condition about the shank portion.

In other embodiments, such as is shown in FIGS. 7 and 8 of the drawings, a lure 50 may has a hook structure 52 and a body structure 54 and these structures may have features similar to or the same as the lure 10. As shown in FIG. 7, the first section 56 and the second section 58 of the shank portion may each extend outwardly from the body structure in perpendicular orientations to each other. The second section 58 of the shank portion may extend in a linear manner out of the body structure to the line securing portion. In some embodiments, the body structure may be substantially spherical in shape. In some embodiments, the body structure is formed of a material with a relatively high density, such as a metal and illustratively lead, to cause the lure to tend to sink in water.

The lure 50 also illustrates a loop securing structure 60 for removably holding a loop of the fishing line on the body structure, so that the fishing line may be wrapped about the second section 58 of the hook structure. The loop securing structure 60 may include a line barb 62 that is configured to hook a loop of fishing line. The line barb may have a tip 64 that extends away from the line securing portion of the hook structure 52. The line barb 62 may be positioned on the second section 58 of the shank portion. The line barb 62 may also include a first body extension 66 that extends from the body structure and may have a frusta-conical shape. The line barb 62 may be formed on the first body extension 66. The first body extension may extend toward the line securing portion of the hook structure along the second section 58. The line securing portion of the hook structure 52 may be substantially identical to the configurations shown in FIGS. 1 through 5 of the drawings.

The lure 50 further may have an accessory securing structure 68 for removably holding an accessory on the body structure. The accessory securing structure may include an accessory barb 70, which may have a tip 72 extending away from the hook portion of the hook structure. The accessory barb 70 may be positioned on the first section 56 of the shank portion. The accessory securing structure 68 may also include a second body extension 74 that extends from the body structure. The accessory barb 70 may be formed on the second body extension 74, which may extend toward the hook portion of the hook structure along the first section 56.

It should be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be encompassed that fall within the scope of the claims.

We claim:

1. A fishing lure comprising:
a hook structure including a hook portion for engaging the mouth flesh of a fish, a shank portion connected to the hook portion, and a line securing portion for securing a line to the hook structure, the line securing portion having a first extent and a second extent, the first and second extents being looped such that the second extent crosses and bypasses the first extent to form an unsecured loop, the second extent being movable away from the first extent so that a portion of fishing line is movable between the first and second extents and into an eye of the loop without threading an end of the line through the eye;
a body structure mounted on the hook structure; and
a loop securing structure formed on the body structure for removably holding a loop of fishing line on the body structure;
wherein the shank portion has a first section and a second section with the first section having a first segment located exterior of the body structure and the second section having a second segment located exterior of the body structure, the first segment being linear from the body structure to the hook portion, the second segment being linear and straight from the body structure to the first extent of the line securing portion forming the unsecured loop;
wherein an angle between the linear first segment and the linear second segment of the shank portion is substantially perpendicular; and
wherein the loop securing structure includes a first body extension on the second section of the shank portion which extends from the body structure towards the line securing portion of the hook structure along the second section, the first body extension having a first end at the body structure and a second end located between the line securing portion and the first end of the first body extension, wherein the loop securing structure includes a line barb configured to hook a loop of fishing line, wherein the line barb is positioned on the second section of the shank portion, the line barb having a tip extending away from the line securing portion of the hook structure and toward the body structure, and wherein the line barb is formed on the first body extension at a location between the first and second ends of the first body extension.

2. A fishing lure comprising:
a hook structure including a hook portion for engaging the mouth flesh of a fish, a shank portion connected to the hook portion, and a line securing portion for securing a line to the hook structure;
a body structure mounted on the hook structure, the body structure having an exterior surface;
a loop securing structure formed on the body structure for removably holding a loop of fishing line on the body structure;
an accessory securing structure for removably holding an accessory on the body structure, the accessory securing structure is formed on the body structure, the accessory securing structure including an accessory barb having a tip extending away from the hook portion of the hook structure, the accessory barb being positioned on the first section of the shank portion, the accessory securing structure including a second body extension extending from the body structure toward the hook portion of the hook structure along the first section, the accessory barb being formed on the second body extension; and
wherein the line securing portion has a first extent and a second extent, the first and second extents being looped such that the second extent crosses and bypasses the first extent to form an unsecured loop, the second extent being movable away from the first extent so that a portion of fishing line is movable between the first and second extents and into an eye of the loop without threading an end of the line through the eye;

wherein the shank portion has a first section with a first segment extending from the exterior surface of the body structure and a second section with a second segment extending from the exterior surface of the body structure, the first segment being straight from the exterior surface of the body structure to the hook portion, the second segment being straight from the exterior surface of the body structure to the first extent of the line securing portion forming the loop;

wherein an angle between an axis of the straight first segment and an axis of the straight second segment of the shank portion is substantially perpendicular; and wherein the loop securing structure includes a first body extension on the second section of the shank portion which extends from the body structure toward the line securing portion of the hook structure along the second section, the first body extension having a first end at the body structure and a second end located between the line securing portion and the first end of the first body extension, wherein the loop securing structure includes a line barb configured to hook a loop of fishing line, wherein the line barb is positioned on the second section of the shank portion, the line barb having a tip extending away from the line securing portion of the hook structure and toward the body structure, and wherein the line barb is formed on the first body extension at a location between the first and second ends of the first body extension.

* * * * *